United States Patent
Bagdelen et al.

(10) Patent No.: US 12,314,047 B2
(45) Date of Patent: *May 27, 2025

(54) LEARNING METHOD AND SYSTEM FOR DETERMINING PREDICTION HORIZON FOR MACHINERY

(71) Applicant: SAP SE, Walldorf (DE)

(72) Inventors: Cahit Bagdelen, Walldorf (DE); Atreju Tauschinsky, Walldorf (DE)

(73) Assignee: SAP SE, Walldorf (DE)

( * ) Notice: Subject to any disclaimer, the term of this patent is extended or adjusted under 35 U.S.C. 154(b) by 228 days.

This patent is subject to a terminal disclaimer.

(21) Appl. No.: 18/308,798

(22) Filed: Apr. 28, 2023

(65) Prior Publication Data

US 2023/0259119 A1 Aug. 17, 2023

Related U.S. Application Data

(63) Continuation of application No. 17/524,195, filed on Nov. 11, 2021, now Pat. No. 11,681,284.

(Continued)

(51) Int. Cl.
G05B 23/02 (2006.01)
G06F 18/21 (2023.01)
G06F 18/214 (2023.01)

(52) U.S. Cl.
CPC ..... G05B 23/0283 (2013.01); G05B 23/0224 (2013.01); G06F 18/214 (2023.01); G06F 18/217 (2023.01)

(58) Field of Classification Search
CPC ............ G05B 23/0283; G05B 23/0286; G05B 23/0224; G05B 23/0227; G05B 23/0229;

(Continued)

(56) References Cited

U.S. PATENT DOCUMENTS 10,749,881 B2 8/2020 Tauschinsky et al.
10,824,498 B2 11/2020 Kind et al.
(Continued)

OTHER PUBLICATIONS

Chebel-Morello, "From Prognostics and Health Systems Management to Predictive Maintenance 2" Hoboken, NJ: ISTE Ltd/John Wiley and Sons Inc, 2017, 160 pages.
(Continued)

*Primary Examiner* — Son T Le
*Assistant Examiner* — Matthew W. Baca
(74) *Attorney, Agent, or Firm* — Fish & Richardson P.C.

(57) ABSTRACT

The present disclosure relates to computer-implemented methods, software, and systems for predicting failure event occurrence for a machine asset. Run-to-failure sequences of time series data that include an occurrence of a failure event for the machine asset are received. One or more candidate cut-off values are determined based on iterative evaluation of a plurality of potential cut-off points. A candidate cut-off value is identified as substantially corresponding to a local peak point for calculated distances between relative frequency distributions of positive and negative sub-sequences. A failure prediction model is iteratively trained to iteratively extract sets of relevant features to determine a prediction horizon for an occurrence of the failure event for the machine asset. A candidate cut-off value associated with a model of highest quality from a set of failure prediction models determined during the iterations is selected to determine the prediction horizon for the machine asset.

20 Claims, 10 Drawing Sheets

Related U.S. Application Data

(60) Provisional application No. 63/229,404, filed on Aug. 4, 2021.

(58) Field of Classification Search
CPC ............ G05B 23/0232; G05B 23/0243; G05B 23/0245; G05B 23/0254; G05B 23/0275; G05B 23/0278; G05B 23/0281; G05B 23/024; G06K 9/6256; G06K 9/626; G06K 9/6261; G06K 9/6262; G06K 9/6267; G06F 18/214; G06F 18/217; G06F 18/2163; G06F 18/2193; G06F 17/18; G06F 18/2415
See application file for complete search history.

(56) References Cited

U.S. PATENT DOCUMENTS

| | | |
|---|---|---|
| 10,915,391 B2 | 2/2021 | Meusel et al. |
| 2012/0209569 A1 | 8/2012 | Becourt et al. |
| 2016/0146709 A1 | 5/2016 | Dey et al. |
| 2018/0374104 A1 | 12/2018 | Meusel et al. |
| 2020/0033831 A1 | 1/2020 | Tauschinsky et al. |
| 2023/0037829 A1 | 2/2023 | Bagdelen et al. |

OTHER PUBLICATIONS

Chen et al., "XGBoost: A Scalable Tree Boosting System" KDD'16, Aug. 13-17, 2016, 10 pages.

Demar, "Statistical Comparisons of Classifiers over Multiple Data Sets" Journal of Machine Learning Research, vol. 7, Jan. 2006, 30 pages.

Deutsch et al., "Using Deep Learning-Based Approach to Predict Remaining Useful Life of Rotating Components" IEEE Transactions on Systems, Man, and Cybernetics: Systems, vol. 48, No. 1, Jan. 2018, 11-20, 10 pages.

Elasha et al., "Prognosis of a Wind Turbine Gearbox Bearing Using Supervised Machine Learning" Sensors, vol. 19, No. 14, Jul. 2019, 17 pages.

Feremans et al., "Pattern-based anomaly detection in mixed-type time series" Joint European conference on machine learning and knowledge discovery in databases. Springer, Cham, Sep. 2019, 20 pages.

Gebraeel et al., "Residual-life distributions from component degradation signals: A Bayesian approach" IIE Transactions, vol. 37, No. 6, Jun. 2005, 16 pages.

Gutschi et al., "Log-based predictive maintenance in discrete parts manufacturing" Procedia CIRP, vol. 79, Jan. 2019, 6 pages.

Heng et al., "Rotating machinery prognostics: State of the art, challenges and opportunities" Mechanical Systems and Signal Processing, vol. 23, No. 3, Apr. 2009, 16 pages.

ISO.org [online], "ISO 13381-1:2015(en) Condition monitoring and diagnostics of machines—Prognostics—Part 1: General guidelines" 2015, [retrieved on Sep. 16, 2021], retrieved from: URL <https://www.iso.org/obp/ui/#iso:std:iso:13381:-1:ed-2:v1:en>, 1 page.

Jardine et al., "A review on machinery diagnostics and prognostics implementing condition-based maintenance" Mechanical systems and signal processing 20.7, Oct. 2006, 28 pages.

Kaggle.com [online], "Kaggle Pump Sensor Data for Predictive Maintenance Data Set" Feb. 2010, [retrieved on Nov. 11, 2021], retrieved from: URL <https://www.kaggle.com/>, 1 page.

Lin et al., "Recursive Filters for a Partially Observable System Subject to Random Failure" Advances in Applied Probability, vol. 35, No. 1, 2003, 21 pages.

Moreira et al., "Prognostics of aircraft bleed valves using a SVM classification algorithm" in 2012 IEEE Aerospace Conference, Mar. 2012, 8 pages.

Nowaczyk et al., "Ecml Pkdd Workshop and Tutorial: IoT Stream for Data Driven Predictive Maintenance" Sep. 2020, [retrieved on Nov. 11, 2021], retrieved from: URL <https://abifet.wixsite.com/iotstream2020>, 10 pages.

SAP SE, "What's New for SAP Predictive Asset Insights" Version 2105, May 2021, 28 pages.

Saxena et al., "Turbofan engine degradation simulation data set" NASA Ames Prognostics Data Repository, 2008, 3 pages.

Schwabacher, "A Survey of Artificial Intelligence for Prognostics" in AAAI Fall Symposium: Artificial Intelligence for Prognostics, 2007, 8 pages.

Si et al., "Remaining useful life estimation—A review on the statistical data driven approaches" European Journal of Operational Research, vol. 213, No. 1, Aug. 2011, 14 pages.

Sipos et al., "Log-based predictive maintenance" Proceedings of the 20th ACM SIGKDD international conference on knowledge discovery and data mining, Aug. 2014, 10 pages.

Susto et al., "Machine Learning for Predictive Maintenance: A Multiple Classifier Approach" IEEE Transactions on Industrial Informatics, vol. 11, No. 3, Jun. 2015, 8 pages.

Von Birgelen et al., "Self-Organizing Maps for Anomaly Localization and Predictive Maintenance in Cyber-Physical Production Systems" Procedia CIRP, vol. 72, Jan. 2018, 6 pages.

Wang, "ECML PKDD Tutorial: Predictive Maintenance From a Machine Learning Perspective" Sep. 2015, 56 pages.

Weiss et al., "Learning to Predict Rare Events in Event Sequences" KDD. Vol. 98., Aug. 1998, 5 pages.

Zhang et al., "Degradation prediction model based on a neural network with dynamic windows." Sensors 15.3, Mar. 2015, 6996-7015.

Zhou et al., "Automatic Remaining Useful Life Estimation Framework with Embedded Convolutional LSTM as the Backbone" Aug. 2020, 16 pages.

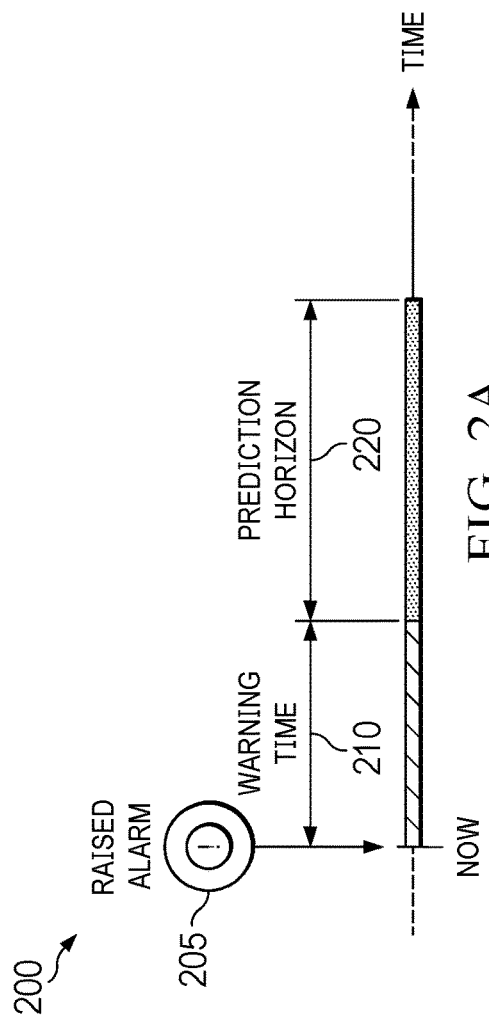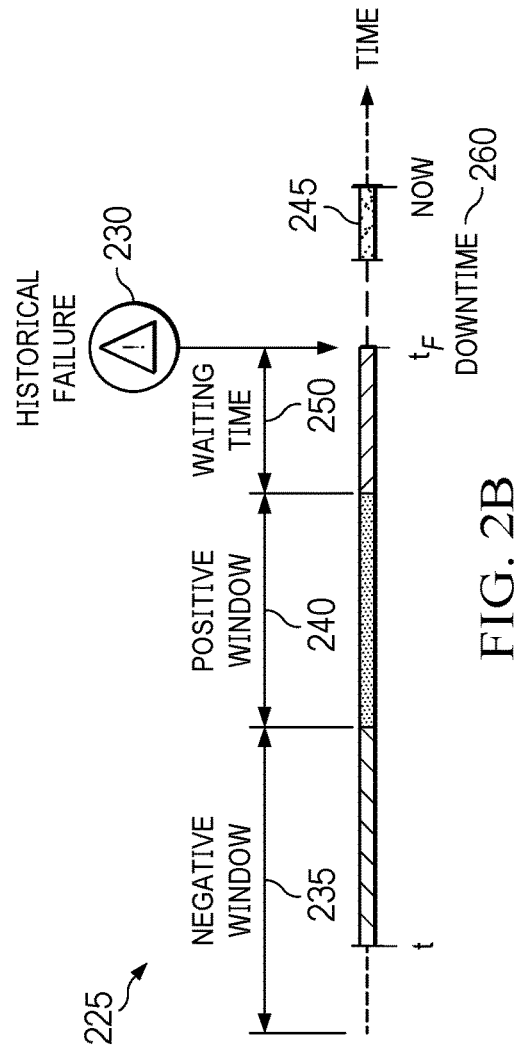
FIG. 2A
FIG. 2B

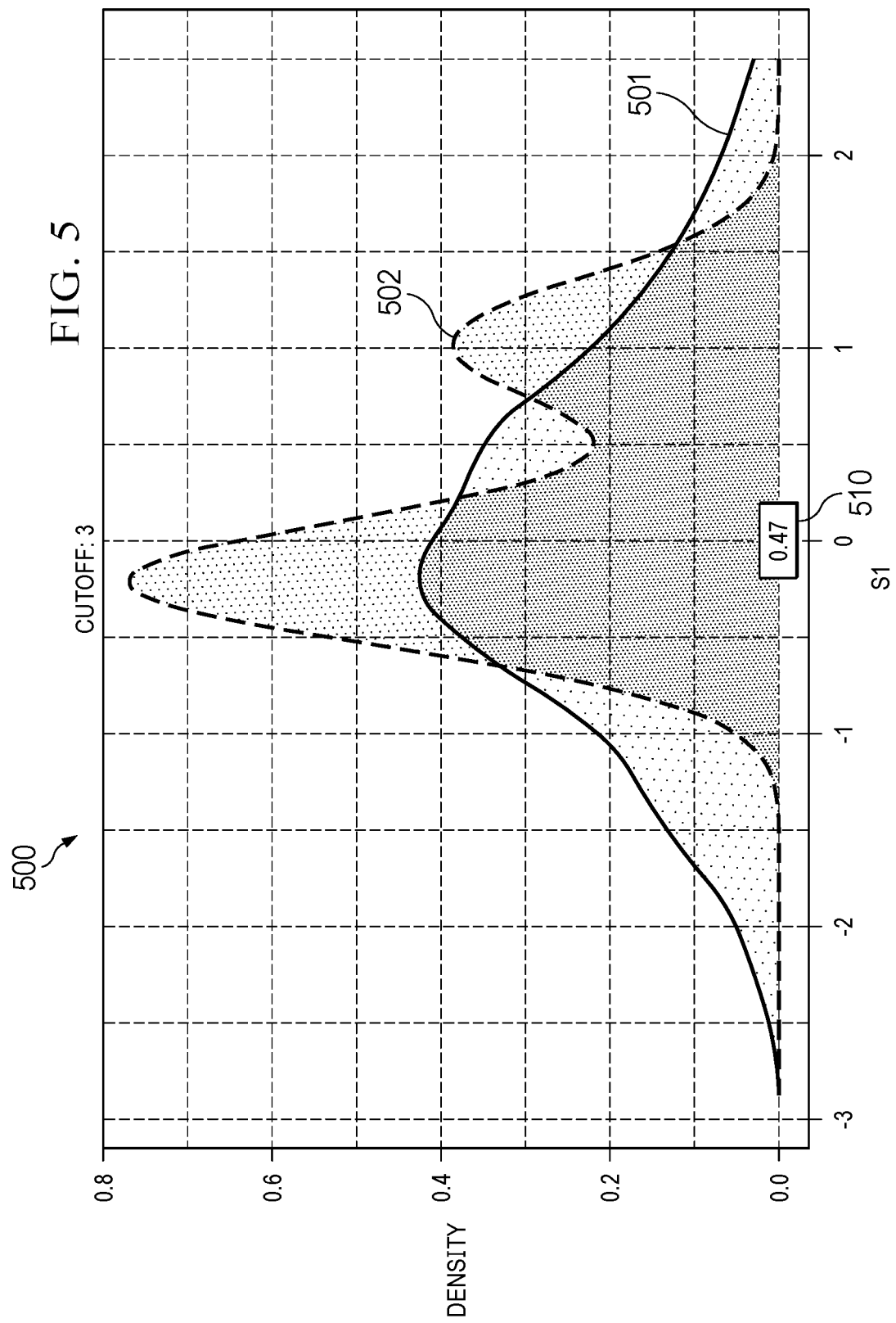

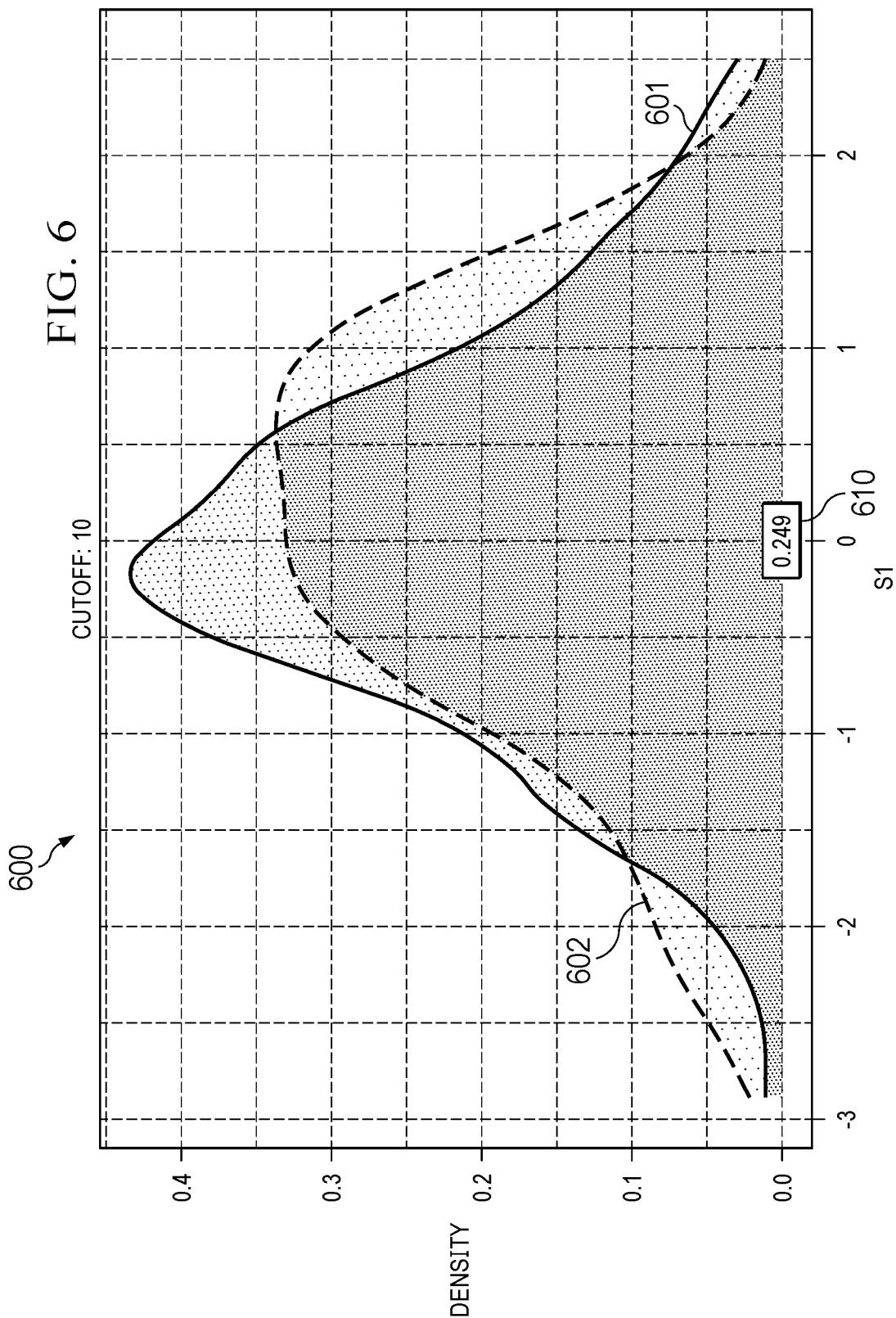

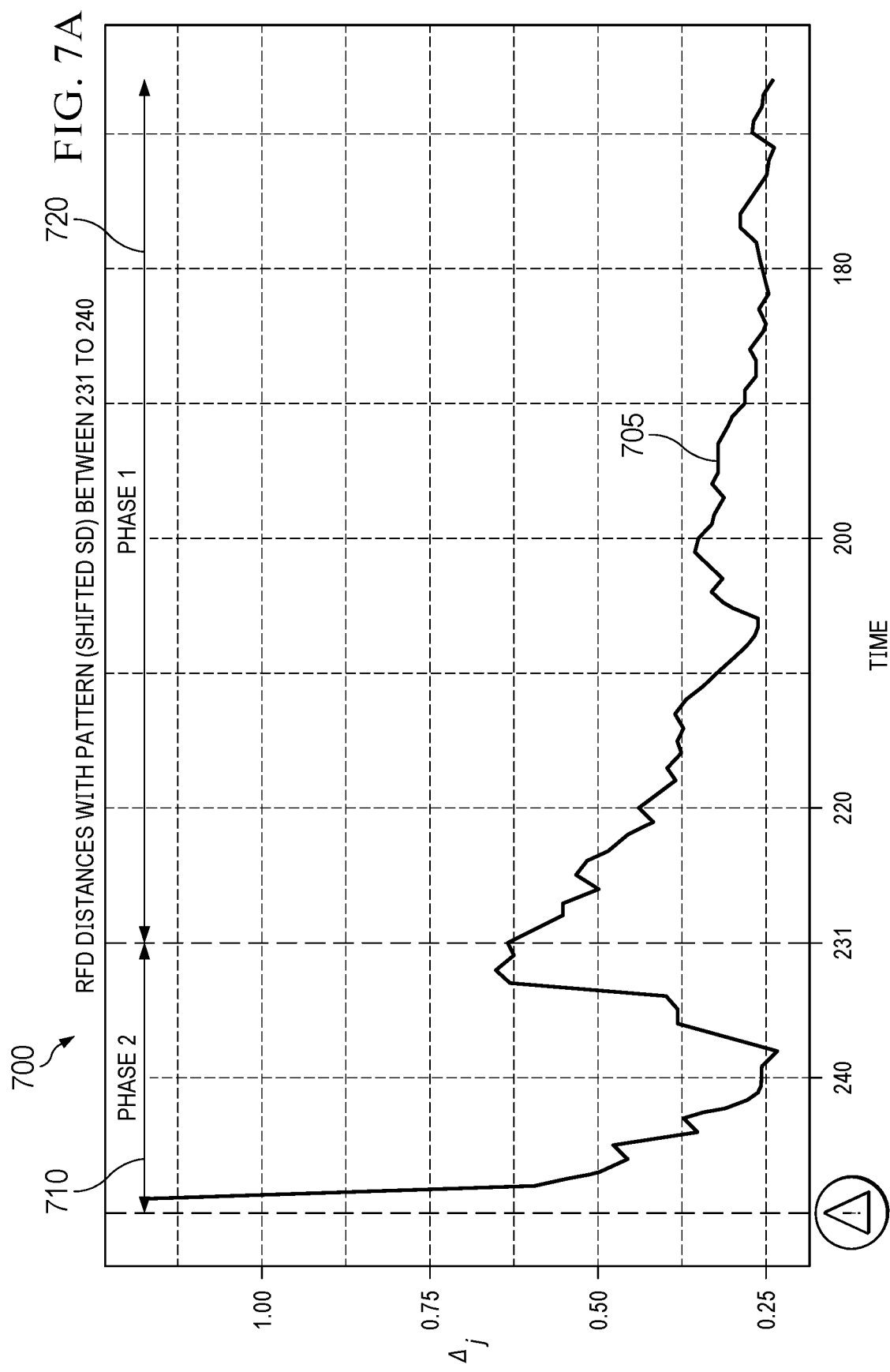

Algorithm 1 Heuristic algorithm for PH determination

1: $S_0 \leftarrow features$
2: for $f \in S_0$ do
3:    for $cut \in \{PH_{lower}, \ldots, PH_{upper}\}$ do
4:       $(rfd_{f,cut,1}, rfd_{f,cut,2}) \leftarrow getRFDs(X, f, cut)$
5:       $\delta_{f,cut} \leftarrow wasserstein(rfd_{f,cut,1}, rfd_{f,cut,2})$
6: $j \leftarrow 0$
7: while $converged = 0$ do
8:    $n \leftarrow |S_j|$    ▷ nuber of features in S[j]
9:    $\Delta^j \leftarrow \sum_{f \in S_j} (\delta_f) / n$
10:   $ph_j \leftarrow selectPromisingPH(\Delta^j)$
11:   $Y \leftarrow doLabel(X, ph_j)$   ▷ redo labeling w.r.t. ph[j]
12:   $(model_j, S'_j) \leftarrow binClassifier(X, Y)$
13:   $consistency_j \leftarrow |S'_j \cap S_j| / |S'_j \cup S_j|$
14:   $j \leftarrow j + 1$
15:   $S_j \leftarrow S'_{j-1}$
16:   $converged \leftarrow checkConvergence(j,$
17:                       $maxIter, model, consistency)$
18: $b \leftarrow argmax_j(model.quality_j)$
19: $PH \leftarrow ph_b$

*FIG. 8*

LEARNING METHOD AND SYSTEM FOR DETERMINING PREDICTION HORIZON FOR MACHINERY

CLAIM OF PRIORITY

This application claims priority under 35 USC § 120 to U.S. patent application Ser. No. 17/524,195, filed on Nov. 11, 2021, titled "LEARNING METHOD AND SYSTEM FOR DETERMINING PREDICTION HORIZON FOR MACHINERY FAILURES"; which claims priority under 35 USC § 119(e) to U.S. Patent Application Ser. No. 63/229,404, filed on Aug. 4, 2021, titled "LEARNING METHOD AND SYSTEM FOR DETERMINING PREDICTION HORIZON FOR MACHINERY FAILURES"; the entire contents of both and together are hereby incorporated by reference.

TECHNICAL FIELD

The present disclosure relates to computer-implemented methods, software, and systems for data processing.

SUMMARY

Implementations of the present disclosure are generally directed to computer-implemented method for predicting failure event occurrence for a machine asset.

One example method may include operations such as: receiving run-to-failure sequences of time series data for the machine asset, wherein each of the run-to-failure sequences includes an occurrence of a failure event and a corresponding portion of condition monitoring data associated with a time period preceding the occurrence of the failure event, wherein different portions of the condition monitoring data include different data for a plurality of features associated with the failure event; determining one or more candidate cut-off values from a plurality of potential cut-off points based on iterative evaluation of the plurality of potential cut-off points, wherein a candidate cut-off value is identified from the plurality of potential cut-off points as substantially corresponding to a local peak point for calculated distances between relative frequency distributions of positive and negative sub-sequences, wherein the positive and negative sub-sequences are defined by dividing the run-to-failure sequences into two sets based on the plurality of potential cut-off points; iteratively training a failure prediction model by using a classification algorithm to iteratively extract sets of relevant features from the plurality of features to determine a prediction horizon for an occurrence of the failure event for the machine asset; selecting a candidate cut-off value associated with a model of highest quality from a set of failure prediction models determined during the iterations; and based on the selected candidate cut-off value, determining the prediction horizon for the machine asset.

In some instances, the method may further include operations such as: iteratively evaluating the condition monitoring data associated with occurrences of the failure event. The iterative evaluation may include: dividing the run-to-failure sequences into sets of a negative and a positive sub-sequences of data associated with the features, wherein each run-to-failure sequence is divided in two based on a plurality of potential cut-off points defined for a corresponding iterative evaluation, wherein the plurality of potential cut-off points are time points for evaluation of corresponding potential prediction horizons to determine a prediction horizon for the machine asset; determining relative frequency distributions of the positive and the negative sub-sequences for each of the plurality of features and for each of the plurality of potential cut-off points; and calculating distances between the determined relative frequency distributions of the positive and the negative sub-sequences for the plurality of features for each of the plurality of potential cut-off points.

In some instances, the method may include iterative plotting of a plurality of average representations of calculated distances on a two-dimensional curve. The plotting can be performed for each separate point from the plurality of potential cut-off points. In some of those instances, each average representation can be associated with a plurality of relevant features that are extracted in a previous iteration and with a corresponding cut-off point.

In some instances, each pair of a negative and a positive portion is a portion of the condition monitoring data from each of the run-to-failure sequences that is associated with a corresponding condition feature.

In some more instances, the method may further include receiving the condition monitoring data that is time series data including the plurality of features, wherein the features are time series data generated at a plurality of sensors.

In some instances, first time series data from the condition monitoring data can be associated with a first feature from the plurality of features, wherein the first feature is associated with one or more sensors from a plurality of sensors generating the condition monitoring data. In some of those instances, the first time series data can be raw sensor data generated by one sensor from the plurality of sensors, or the first time series data is aggregate (or calculated) data as a function of sensor data read from one or more sensors from the plurality of sensors.

In some instances, the method may further include receiving historic data related to at least one past failure event at the machine asset, wherein the historic data is received from a maintenance service collecting data for machine assets, wherein the run-to-failure sequences of time series data for the machine asset is determined based on combining the condition monitoring data and historic data related to at least one past failure event according to a time scale mapping.

In some instances, the method can further include providing a notification for the determined prediction horizon as an alert for execution of a maintenance action for the machine asset whenever a positive prediction is made by the trained model based on real time data.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIGS. 2A and 2B are block diagrams for example timelines of a lifecycle of a machine asset including an alert for an approaching failure.

FIG. 5 is a diagram for example relative frequency distributions of two phases of data from sensor readings associated with a machine asset and a prediction horizon equal to 3 in accordance with implementations of the present disclosure.

FIG. 6 is a diagram for example relative frequency distributions of two phases of data from sensor readings associated with a machine asset and a prediction horizon equal to 10 in accordance with implementations of the present disclosure.

FIG. 7A is a diagram for an example plot representing distances between relative frequency distributions (RFDs) calculated based on a time series data associated with a given feature in accordance with implementations of the present disclosure.

FIG. 8 is an example pseudo source code for implementing an algorithm for prediction horizon determination in accordance with implementations of the present disclosure.

DETAILED DESCRIPTION

Figure 1:
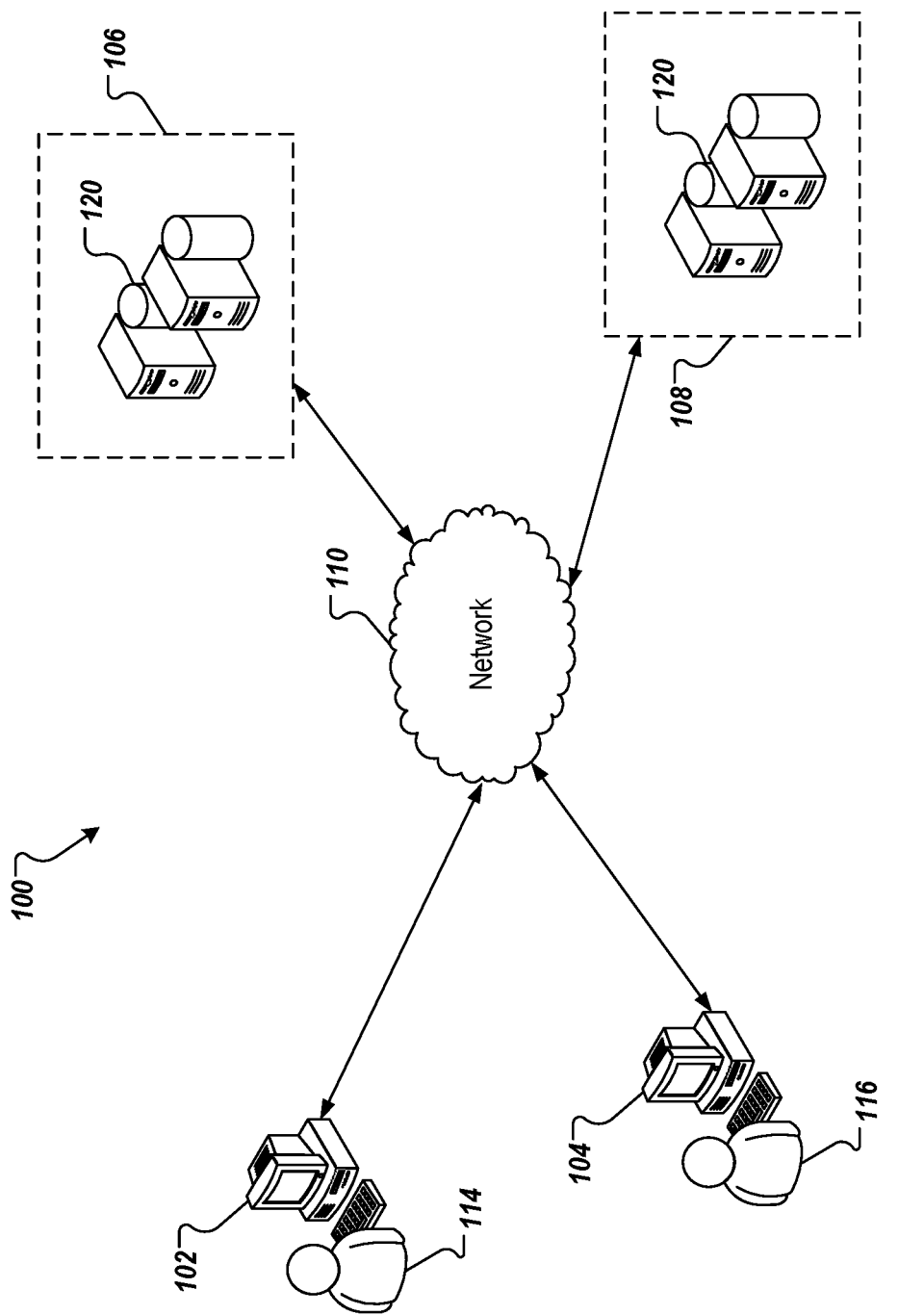
FIG. 1 depicts an example system that can execute implementations of the present disclosure.

The present disclosure describes various tools and techniques for predicting failure event occurrence for a machine asset.

Predictability of maintenance events and expected failures associated with machine assets is an important aspect of machine and machine lifecycle management. In some instances, lifecycle of machine assets such as complex machines, compressors, trains, and power plants, among other examples of machines and tools, can be managed based on condition monitoring and predictive maintenance. For example, one or more assets can be monitored based on a real time analysis of diverse Internet-of-Things (IoT) data collected from the one or more assets.

In some instances, failure prediction for an asset can be defined as a prediction of upcoming unexpected maintenance-relevant events for the asset. For example, a part of the asset can be worn-out and a failure event can be expected for the asset that is also related with a downtime (e.g., a period of time while the asset cannot be used productively) for the asset. In the context of condition-based maintenance (CBM) and predictive maintenance (PdM) (or more generally referred to as maintenance based on "prediction of failures"), the prediction of upcoming unexpected maintenance-relevant events is highly relevant.

In some instances, machine assets (or assets) can be analyzed in the context of CBM and PdM to support definition of a maintenance process for the machine assets that is more efficient. In some of those instances, the maintenance process can facilitate efficient usage of each of the machine assets that can be synchronized and optimized to reduce downtime for a manufacturing process that incorporates the machine assets. Further, the maintenance processes can be defined to reduce cost for maintenance and losses due to failures in the machine assets. For example, multi-component industrial machine can be an object for execution of an IoT condition monitoring and predictive maintenance in the context of a manufacturing or machining process at a production site.

In some instances, quality of the prediction models and reliability of the predictions for failures of machine assets can be of significant relevance (or even critical) to avoiding unexpected breakdowns of one or more of the assets while ensuring their reliable operation. In some instances, machine learning techniques (e.g., binary classification) can be employed to train failure prediction models using the historical condition monitoring data (e.g., sensor data or readings from a machine asset) together with the information about historical failure events. In some instances, if a positive prediction (i.e., expectation for a failure) is made by a failure prediction model in real time, that positive prediction can be interpreted as related to an increased probability of a failure within a given time horizon (also called a "prediction horizon"), and an alert can be raised. In some instances, that alert can enable a machine operator to react by performing inspections and/or necessary maintenance operations.

In some instances, a software application can be implemented to incorporate predictive functionality for predicting failures and a corresponding prediction horizon for machine as sets. In those cases, the software application can output a prediction parameter for a failure occurrence that can include a prediction horizon as a time period within which a failure is to be expected. In some instances, based on that prediction parameter, work schedules for the machine asset can be managed, maintenance can be planned, and/or spare parts can be ordered, among other examples of activities that can be triggered to facilitate improved utilization of machine assets. For example, based on prediction parameters for assets in a factory that includes different machines and tools for machining parts and products, the overall maintenance of the factory can be improved, the amount of production can be optimized, and the cost for ordering new assets or spare parts, renting a replacement asset for a period of time, or substituting one asset with another asset for execution of certain tasks can be improved.

In some instances, machine prognostics can aim at predicting faults or failures in advance. This prognostics can include predicting future conditions, the remaining operational (useful) life of a machine asset, a probability of reliable operation of an asset (e.g., equipment) until some future time, and risk for one or more incipient failure modes. In some instances, the probability that an asset (machine or machine asset) operates without a fault until a next inspection (or condition monitoring) interval could be a good reference for maintenance personnel to determine whether the inspection interval is appropriate or not.

In general, classification-based failure prediction approaches (in the contexts of PdM and CBM) can rely on a given prediction horizon that can be provided by an end user, for example, in a manual way. However, by utilizing predictions for a prediction horizon that rely on conditional monitoring data analysis and techniques, the prediction horizon can be determined iteratively and through a trained process, rather than relying on a manual input that can be subjective and/or inaccurate. The definition of a prediction horizon as a time period can be used to determine a horizon of validity of an alert for an asset that can be raised due to a received positive prediction. The positive prediction can be determined based on an underlying failure prediction model trained to determine prediction horizons. In some instances, the selection or determination of a prediction horizon can be related and can affect the quality of the machine learning model. Therefore, selection of a suitable prediction horizon can be a difficult decision for the end user and/or a subjective user decision.

In some instances, a prediction horizon value can be assumed to be known. Knowing the prediction horizon means knowing the positive and negative values in the historical data. But, an inconvenient value of prediction horizon can lead to label noise, and reduces the model quality. A naïve approach could be to try all possible "n" prediction horizon values, train "n" different models, and select the best out of those. However, since "n" is usually a large number, this may be inapplicable.

In some cases, using a prediction horizon value that is determined based on a user selection without additional prediction logic supporting the selection can reduce the quality of a failure prediction model that can be implemented to determine failures for machine assets that are used in industry. For example, if the prediction horizon value is inaccurate, the reliability of the failure prediction can be significantly reduced. For critical assets or machines, an unexpected break-down can be extremely expensive or even quite risky. Also, intrusive inspections and frequent regular maintenance operations can have many direct and indirect costs. Therefore, avoiding unnecessary inspections and maintenance without risking the reliability is desired by machine operators. In some instances, such requirements requires high quality failure prediction models.

In some instances, classification based approaches rely on a prediction horizon parameter, to which the model quality is sensitive. However, existing studies do not provide any manner of determining this critical parameter; instead, they rely on assumptions. In some instances, the prediction horizon can be learned from data to provide a prediction that is with higher certainty. That prediction can be based on a heuristic algorithm to learn the prediction horizon based on the given data. In some instances, by using a prediction horizon that is more accurately determined, model quality of prediction algorithms is improved and this supports increased usability and general applicability of classification-based failure prediction approaches in industry.

In some instances, uncertainty when determining a prediction horizon can be associated with several problems. Firstly, any "biased" prediction horizon can cause label noise when labeling training data to train a machine learning model. Secondly, evaluation and comparison of models, based on different prediction horizon values, becomes cumbersome, due to missing consensus on the ground truth. Lastly, an unknown prediction horizon prevents the ability to generalize, as prediction horizon is a property of data, and a generic approach may need to provide a way to learn prediction horizon from data.

In some instances, a heuristic algorithm can be provided for determining of prediction horizon as a generic approach that has improvements in model quality provided by improvements in the determination of the prediction horizon. In some instances, based on applying such an heuristic approach, patterns associated with precursors of known historic failures can be learned and new incipient failures can be inferred within a specified time horizon (timeline).

FIG. 1 depicts an example architecture 100 in accordance with implementations of the present disclosure. In the depicted example, the example architecture 100 includes a client device 102, a client device 104, a network 110, and a cloud environment 106 and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the cloud environment 106 include at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on host infrastructure. In some instances, the cloud environment 106 can include multiple cluster nodes that can represent physical or virtual machines. A hosted application and/or service can run on VMs hosted on cloud infrastructure. In some instances, one application and/or service can run as multiple application instances on multiple corresponding VMs, where each instance is running on a corresponding VM.

FIG. 2A is a block diagram for an example timeline 200 of a lifecycle of a machine asset including an alert for an approaching failure.

Predicting faults or failures in advance is a central aspect of CBM application. Such predictive capabilities are highly desired by the operators of mission critical machinery to avoid unnecessary maintenance, while ensuring reliability.

Modeling failure prediction can be defined as a binary classification problem where a classifier (e.g., a machine learning model) can learn a model for a specific prediction horizon. A timeline 200 of a lifecycle of a machine asset can include negative periods (e.g., working periods that are not associated with high chances of failure), positive periods (prediction horizons), warning periods, and subsequent failures, where after a failure, maintenance actions can occur, and a new negative period can start again. For example, for waiting time 210 that is 2 days and prediction horizon 220 that is 13 days, a raised alarm 205 can be interpreted as follows: There is an increased probability of failure within 2 to 15 days. A positive prediction can imply that an incipient failure is expected during the span of the prediction horizon. When a predictive maintenance solution raises an alert (205), machine operators may need to react with a maintenance operation (e.g., repair, fix, update, etc.) for which they need a warning time 210.

FIG. 2B is a block diagram for an example timeline 225 of a lifecycle of a machine asset including an alert for an approaching failure. The example timeline 225 can be considered as a historical run-to-failure (RTF) sequence [$t_0$; $t_F$). At time stamp $t_0$ the machine asset can be in a healthy state. Later in the RTF sequence 225, a faulty state may start, where such state may be unobservable without an intrusive inspection. Eventually the faulty state evolves into a failure event at time stamp $t_F$.

Each historical failure event together with enough conditional monitoring (CM) data before the event makes up one RTF sequence.

The example timeline 225 includes a first negative period 235, a positive period (prediction horizons) 240, a warning period 250 preceding a historical failure 230, a subsequent failure that is associated with downtime for maintenance for the machine asset 260, and a second negative period 245 that is currently ongoing.

In some instances, the beginning of the prediction horizon 220 can primarily be important for operations officers, for example, handling maintenance and work schedule, as operations officers should react before the beginning of the prediction horizon. As long as the prediction horizon ends before the next planned maintenance, the length of the prediction horizon may not be critical for the maintenance operations. Defining prediction horizon as a parameter is relevant for labeling that can be performed on historical data to perform training on a machine learning algorithm to predict the prediction horizon. FIG. 2B presents historical data for a given machine asset that includes time periods in the past, such as the positive window that substantially corresponds to the prediction horizon 220 of FIG. 2A.

In some instances, in historical data, the input instances that lie within the positive windows (e.g., 220 of FIG. 2A, 240 of FIG. 2B) can be labeled positively, and the instances that lie within the negative windows can be labeled negatively. In some instances, the waiting periods can be excluded from labeling. The labeled data can be provided as training data for training a machine learning model that determines prediction horizon predictions. In some instances, the prediction horizon as a parameter can be interpreted as a property of data, where the prediction horizon is difficult to be determined accurately by a selection of a machine operator. The determination of prediction horizons for labeling can rely on the value of the prediction horizon to determine positively labelled instances (i.e., positive windows) which need to include the patterns associated with the precursors of failures, and exclude every other instance, as much as possible.

In some instances, instead of asking a user to provide a selection of a prediction horizon (e.g., manual selection), the prediction horizon can be automatically learned from CM data in accordance with the implementations of the present disclosure. In some instances, the prediction horizon can be learned by iteratively comparing two phases—a negative and a positive phase of time sequences (time series data) obtained by dividing (or cutting) the time sequences into two sub-sequences (phases) at specific cut-off points given by a possible prediction horizon value.

In some instances, a given prediction horizon value corresponds to a cut-off point in the middle of a time series part of the lifecycle of a machine asset (i.e., the RTF Sequences). If the warning time period from the time series is ignored and excluded, each cut-off point separates the RTF sequence into two subsequences (phases), which can be named "positive phase" and "negative phase". For example, the subsequences can be denoted as phase 1 and phase 2, respectively. In FIG. 2B, for a specific value of the prediction horizon, the positive window (240) shows the positive phase, and the negative windows (235, 245) show the negative phase.

Figure 4:
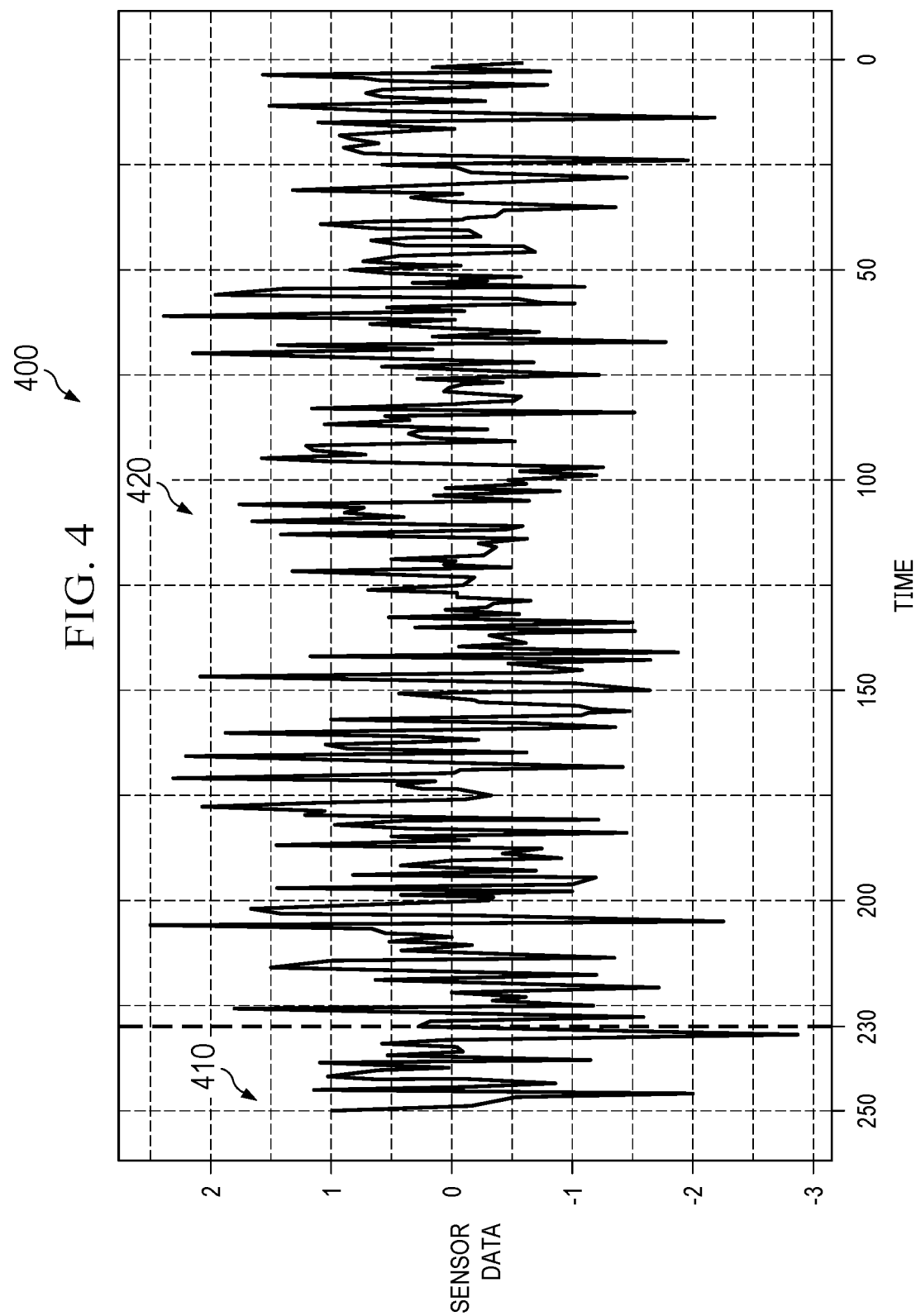
FIG. 4 is a diagram for an example time series plot of sensor readings from sensors associated with a machine asset in accordance with implementations of the present disclosure.

For illustrative purposes, a cut-off point at t=230 (which means ph=20, assuming warning time=0) cuts the time series into two phases in FIG. 4. The two phases of the time series are references as 410 portion of the graphic (that corresponds to the presentation of the data above the cut-off point at 230) and as 420 portion of the graphic (that corresponds to the presentation of the data between 0 and 230) in the below plot.

In some instances, CM data can include data composed of sensor readings. For example, CM data can be data generated from sensor measuring different conditions, such as temperature, pressure, etc. The CM data can be used to determine the condition of an asset, either directly or indirectly. In some instances, CM data can also include operating characteristics of a machine asset, such as operation mode and speed, as well as environmental conditions, such as outside temperature, humidity, etc.

In some instances, CM data is multivariate time series. Each time series can be a series of raw sensor reading, but it can also be a function (e.g., an aggregate function) of one or more sensor readings. In some instances, CM data is time series data of features that can be calculated based on one or more sensor readings. In some instances, the features can be used as the features of a classification model for learning a prediction horizon.

For example, in the context of failure prediction, a feature can be a variable based on sensor reading(s) such as a temperature value, or the sum of values of two temperature sensor readings. In this context, not only a single reading of a sensor may be available, but multiple readings, e.g. every minute or according to another fix time interval. The sensor data can be presented as time series of sensor readings. In some instances, the term feature can be used to refer to a time series of a sensor's reading.

On the other hand, a condition refers to a machine (machine asset). The condition of the machine could be healthy, faulty, and/or failed/broken/down, among other example statuses for the condition of a machine. In some instances, CM data can be the sensor data, which can possibly reveal information about the condition of the machine.

In some instances, a failure event can include an unexpected maintenance-relevant event. For example, a failure event can be associated with a specific failure mode, such as, engine defect of a machine. In some instances, CM data associated with the specific failure mode can be collected and evaluated to determine prediction horizon for the failure event.

In some instances, to predict failure event occurrences for a machine assets, a failure prediction model is iteratively trained by using a classification algorithm to iteratively extract sets of features from the plurality of features. In some instances, the iteratively extracted sets of features includes features that are subsets of the set of all features and are determined at a corresponding iteration as relevant for predicting a potential prediction horizon for the machine asset. The plurality of potential cut-off points can be iteratively evaluated to determine a candidate cut-off value that is associated with a high quality failure prediction model among iteratively trained models for predicting a failure event occurrence.

In some instances, when the training is performed, one or more models are trained in the iterations of the main algorithm, where the training can be done by using binary predictions.

In some instances, the binary prediction, based on the time series data until the point of time of the prediction, has the following meaning:

If a negative prediction is done, it means, according to the model, no failure is expected within the prediction horizon.

If a positive prediction is done, it means, according to the model, a failure is expected sometime during the prediction horizon.

This is one of the aspects/perspectives of prediction horizon, which is about the prediction time.

There can be other aspects of the determination of the prediction horizon that are associated with the training/learning time. Before a model can be trained, a prediction horizon value is be determined. When it is determined, the prediction horizon value defines the positive/negative periods. Each positive window preceding each failure in the historical data has always a size equal to the length of prediction horizon. If prediction horizon equals, for example, 8 hours, then a window of 8 hours preceding each failure is assumed to be positive, and can be labelled positively, while the rest is labelled negatively.

According to the present embodiments and in some instances, instead of training "n" (e.g., hundreds of) models, the solution can train significantly fewer models, for example, 20 models (or a limited number of models that can be defined to correspond to a threshold number of models, or defined by another criteria) that try out "good" (or potentially good) candidates of prediction horizon values. The algorithm considering the distances between relative frequency distribution can be used to determine good estimates of prediction horizon values. For each of these candidate values, a model is trained. At the end, among these approximately 20 models (or other defined/determined number of models), the model with the best quality/approximation is selected. And the prediction horizon, which leads to this best quality model, can be a suggested as a useful prediction horizon for use in providing notifications for executing maintenance actions, in the context of a manufacturing processes, and as part of schedule planning, among other examples for utilization of a determined prediction horizon by the proposed solution.

Prediction horizons, together with defined (or labeled) positive and negative periods can be input into the training process and iteratively evaluated.

In some instances, multiple training iterations can be performed with different models (e.g., 20 different models) to select a best model and to come up with a suggested prediction horizon value.

In some instances, an RTF sequence (such as the timeline described at FIG. 2B) can include multivariate time series from multiple sensor readings. In those instances, both the positive and the negative phase include a subset of a given readings (e.g., temperature sensor reading) during the given RTF sequence. In some instances, each subset from the time series that is associated with one or more readings from one or more sensors, and a relative frequency distribution can be calculated.

For example, cut-off points can be defined to divide an RTF sequence into two phases, where cut-off points are different time points on the timeline span. FIG. 4 illustrates an example time series plot of sensor readings with a cut-off point at t=230. FIG. 4 illustrates time series plot in reverse with respect to the time dimension (in decreasing order of the time points).

Figure 3:
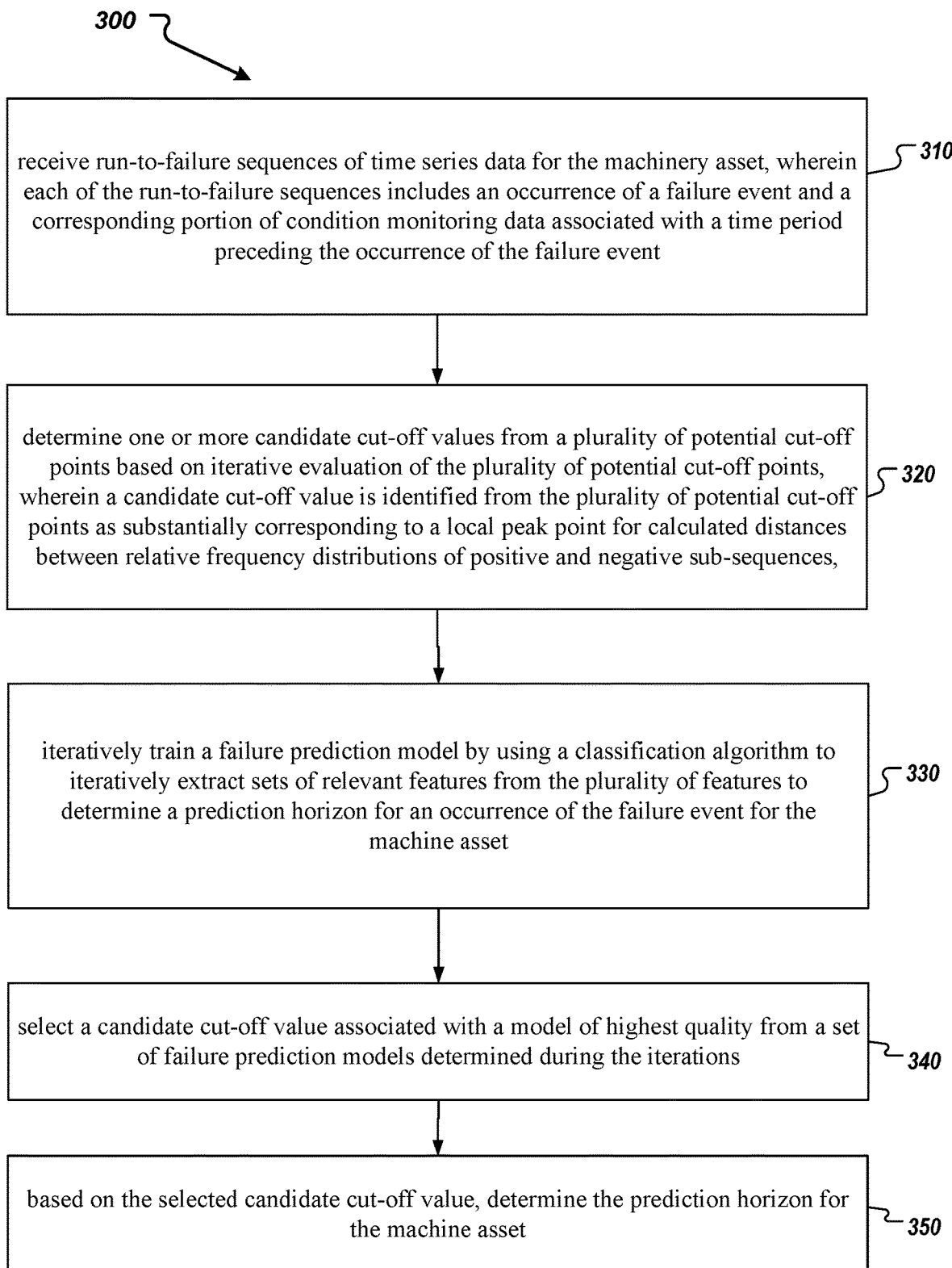
FIG. 3 is a flowchart for an example method for predicting failure event occurrences for a machine asset in accordance with implementations of the present disclosure.

FIG. 3 is a flowchart for an example method 300 for predicting failure event occurrences for a machine asset in accordance with implementations of the present disclosure.

In some instances CM data is received and can include series data including a plurality of features. Time series data for a given feature is generated at one or more of a plurality of sensors similar to the sensors, such as discussed for FIG. 2.

At 310, RTF sequences of time series data for the machine asset are received. Each of the RTF sequences includes an occurrence of a failure event and a corresponding portion of condition monitoring data associated with a time period preceding the occurrence of the failure event. The RTF sequences can be similar to those discussed for FIG. 2. The CM data can be data defining conditions of the machine asset and can be collected from different sensors. In some instances, the CM data can be similar to the condition monitoring data discussed in association with FIG. 2. In some instances, different portions of the CM data can include different data for a plurality of features associated with the failure event.

In some instances, the CM data include first time series data associated with a first feature of a plurality of features. The first feature can be associated with one or more sensors generating the CM data. The first time series data can be raw sensor data generated from a single sensor or is aggregate data determined as a function of sensor data read from one or more sensors from the plurality of sensors.

At 320, one or more candidate cut-off values from a plurality of potential cut-off points can be determined. The candidate cut-off values can be determined based on iterative evaluation of the plurality of cut-off points. In some instances, a candidate cut-off value can be identified from the potential cut-off points as substantially corresponding to a local peak point for calculated distances between relative frequency distributions of positive and negative sub-sequences. The positive and the negative sub-sequences are defined by dividing the RTF sequences into two sets based on the plurality of cut-off points.

At 330, a failure prediction model is iteratively trained by using a classification algorithm to iteratively extract sets of relevant features from the plurality of features to determine a prediction horizon for an occurrence of the failure event for the machine asset. In some instances, the failure prediction model can be trained by iteratively evaluating the RTF sequences that are divided into sets of a negative and a positive sub-sequences of data. RTF sequences that are associated with the plurality of features can be divided into a plurality of negative and positive sub-sequences based on a plurality of potential cut-off points defined for the iterative evaluation. The plurality of potential cut-off points can be preselected as time points that correspond to potential prediction horizons that are evaluated to determine the prediction horizon for the machine asset.

In some instances, training the failure prediction model can include:
dividing the run-to-failure sequences into sets of a negative and a positive sub-sequences of data associated with the features, wherein each run-to-failure sequence is divided in two based on a plurality of potential cut-off points defined for a corresponding iterative evaluation, wherein the plurality of potential cut-off points are time points for evaluation of corresponding potential prediction horizons to determine a prediction horizon for the machine asset;
determining relative frequency distributions of the positive and the negative sub-sequences for each of the plurality of features and for each of the plurality of potential cut-off points; and
calculating distances between the determined relative frequency distributions of the positive and the negative sub-sequences for the plurality of features for each of the plurality of potential cut-off points. In some instances, the failure prediction model is trained to reduce a plurality of potential cut-off points to include a subset of cut-off points that are associated with higher quality of the failure prediction model to identify relevant features for predicting a failure event occurrence.

At 340, a candidate cut-off value associated with a model of highest quality from a set of failure prediction models determined during the iterations is selected.

At 350 based on the selected candidate cut-off value, the prediction horizon for the machine asset is determined.

In some instances, the determined prediction horizon can be provided for further analysis and use for defining production processes. In some instances, the determined prediction horizon can be provided as an alert for execution of a maintenance action for the machine asset whenever a positive prediction is made by the trained model based on the real time data.

FIG. 4 is a diagram for an example time series plot 400 of sensor readings from sensors associated with a machine asset in accordance with implementations of the present disclosure.

In some instances, the sensor readings can be collected from different sensors providing condition data for the machine asset. The time series plot 400 presents sensor reading values on the y-axis that are collected at given time points defined on the x-axis. The time series plot is divided into two phases based on a cut-off point at t=230 that defined a prediction horizon equal to 20. The time series plot is divided into two phases—positive phase 410 and a negative phase 420—where the positive phase corresponds to the prediction horizon.

In some instances, multiple plots corresponding to the plot 400 can be defined for different prediction horizon values. In some instances, phases defined for time series based on different cut-off points (i.e., different prediction horizon values) can be compared, and relative frequency distributions (RFDs) for each two phases of multiple time series cut at different time points can be calculated.

For example, FIGS. 5 and 6 describe relative frequency distributions of the two phases of data from same time series that are cut at different cut-off points. FIGS. 5 and 6 plot relative frequency distributions based on the same time series data but different cut-off points (i.e., different prediction horizons). The calculation of the RFDs is based on determine relativeness between the defined positive and negative phases.

FIG. 5 is a diagram of example relative frequency distributions of two phases of data from sensor readings associated with a machine asset and a prediction horizon equal to 3, in accordance with implementations of the present disclosure. FIG. 5 presents two-phase RFDs for time series that are cut off at time point value that is equal to 3. FIG. 5 presents a curve 501 associated with the first negative phase and a curve 502 associated with the second positive phase.

FIG. 6 is a diagram for example relative frequency distributions of two phases of data from sensor readings associated with a machine asset and a prediction horizon equal to 10, in accordance with implementations of the present disclosure. FIG. 6 presents two-phase RFDs for time series that are cut off at a time point value that is equal to 10. FIG. 6 presents a curve 601 associated with the first negative phase and a curve 602 associated with the second positive phase.

In some instances, if a feature (corresponding to one or more sensor readings) is a representative feature, the distance between two phases can contain relevant information about the selection of prediction horizon (i.e., the cut-off point) between the phases.

The distance between the two phases of a given feature can be calculated using a Wasserstein distance measure.

FIGS. 5 and 6 include a respective distance value as calculated on each of the plots—510 at FIG. 5 and 610 at FIG. 6.

In some instances, a prognostic data set can include several RTF sequences. Each RTF sequence can start with a healthy phase, followed by a shorter faulty phase which eventually evolves into a failure at the end. A period of warning time can be removed from the end of each RTF, as discussed before. To calculate the distance between RFDs, for example, for a single feature and for a given cut-off point, first each RTF sequence is grouped into 2 sub-sequences (or phases), separated at $t_F$–cut. For example, for a specific RTF=$[t_0; t_F)$:

$$\{phase_{cut,1}, phase_{cut,2}\} = \{[t_0, t_F\text{–cut}), [t_F\text{–cut}, t_F)\}$$

In some instances, frequency distributions of a first feature f can be calculated for the two defined phases based on a single cut-off point, and two distributions can be determined. Afterwards, a distance between the two RFDs can be calculated. In some instances, the calculation of RFDs can be performed for every feature in a given set of defined features, and the number of differences that can be calculated corresponds to the number of features multiplied by the number of cut-off points that are considered. In some instances, the calculated distances can be averaged for a given cut-off point:

$$\delta_{f,cut} \leftarrow |rfd_{f,cut,1} - rfd_{f,cut,2}|$$

$$\Delta_{cut}^j \leftarrow \sum_{f \in S_j} (\delta_{f,cut})/n$$

In some instances, a curve representing the calculated RFDs per features can be represented (plotted) on a two-dimensional chart to facilitate analysis over the data. FIG. 7A represents a curve for RFDs calculated based on given time series data as conditional data that can be used to determine prediction horizon.

FIG. 7A is a diagram for an example plot 700 representing distances between RFDs calculated based on the time series, as for example those presented on FIG. 4. The plot 700 presents calculated distances on a time scale, where each point in the time scale corresponds to a specific cut-off value. A cut-off value separates the time series into two phases. In other words, the plot 700 represents calculated distances between RFDs for different cutoff values. Each point on the curve presents the distance between RFDs for one cut-off value. For example, the cut-off value at a time point equal to 231 separates the original time series given in FIG. 4 into two phases: phase 720 is the first phase that is the negative phase, and phase 710 is the second phase that is the positive phase. At time point 231, the value on the y axis presents the distance of RFDs between these two phases of FIG. 4. The curve includes an anomaly pattern at 705 that shifts the increase of the curve to a decrease and creates a local peak in the plot.

Figure 7B:
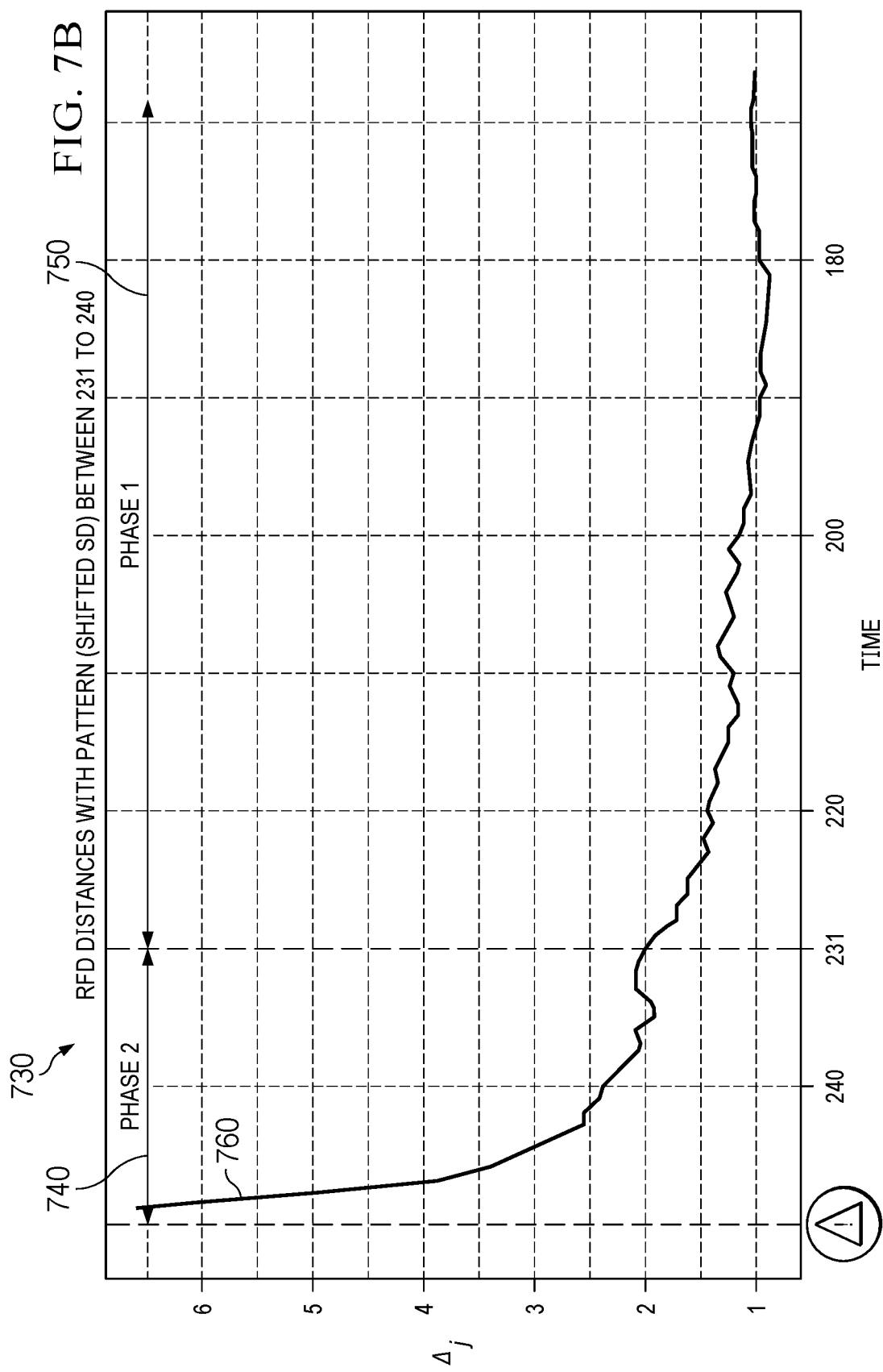
FIG. 7B is a diagram for an example plot 730 representing average distances between relative frequency distributions calculated based on a time series data associated with multiple features in accordance with implementations of the present disclosure.

In some instances, if there are not any anomalous subsequences, and if we ignore smaller increases due to noise, a curve presenting distances between RFDs may decrease monotonically in the first half of the plot (e.g., in the case where the plot is organized according to a reverse time scale, as in FIGS. 7A and 7B) for decreasing time stamps, as in some cases smaller cutoff values lead to a less diverse second phase (negative phase) in terms of frequency distribution. A less diverse negative phase can be expected to be dissimilar to a first positive phase in terms of RFDs. This, in turn, can lead to greater distance between the RFDs of both phases. In other cases, if the cutoff value is higher, diversity of the negative phase increases, which in turn leads to increased similarity of theirs RFDs, and the distance between RFDs of both phases decreases. Therefore, on the reversed time scale, from left to right, the general trend of the distance curve should generally be decreasing in cases where no anomalous pattern (subsequence) exists in the time series.

As illustrated in FIG. 7A, an opposite (increasing) trend, which leads to a local peak, implies the existence of pattern which is included in the positive phase 710 (on the left-hand side), but not in the first negative side 720 (on the right). An example of such local maxima is visible around the presented cut-off at time=231 in FIG. 7A.

In some instances, a key task of searching possible prediction horizon candidates is about identifying such peaks on the distance curves from left to right, and selecting the cut-off values after such peaks. For such special cut-off values, the prediction horizon candidates can be simply determined since the time span between the cut-off time and the failure time is equal to the sum of the prediction horizon and the warning time, as presented in formula (1):

$$\text{Failure time point–cut-off time point=prediction horizon+waiting time} \quad (1)$$

In some instances, the waiting time can be a given operational parameter.

FIG. 7B is a diagram for an example plot 730 representing average distances between relative frequency distributions calculated based on a time series data associated with multiple features in accordance with implementations of the present disclosure. The plot 730 presents average calculated distances between frequency distributions of multiple features on a time scale. In other words, the plot 730 of FIG. 7B presents the average of a plurality of distance curves (e.g., curves such as the curve presented at FIG. 7A). Each point on the curve presented at FIG. 7B defines the average distance for one cut-off value, which separates the original time series into two phases. For example, the cut-off value at time point equal to 231 separates the original time series given into two phases: phase 750 is the first phase and is the negative phase, and phase 740 that is the second phase and is the positive phase.

In some instances, the averaged distances corresponding to points of the curve presented on plot 730, FIG. 7B are determined based on several normally distributed time series, in addition to the time series associated with FIG. 4. In some instances, one of the series can be with anomalous pattern, and the rest of the time series used for generating the averaged distance can be without any anomalous patterns. As presented on FIG. 7B, a distance curve that is an averaged distance curve can be smoother than any or at least a part of the individual plots of those time series that are part of the whole set of multiple time series, as different kinds of noise from multiple series get balanced by each other.

In some instances, candidate cut-off points are considered during several iterations of evaluation of data and generated plots for curves associated with relative distance distribution and different time series data in the course of iterations of an algorithm to determine predictive horizons. The candidate cut-off points can be evaluated in the context of determining anomalies in the plotted curved defining distances between RFDs, and the unimportant features can be iteratively eliminated from consideration to determine a reliable model for determining prediction horizons.

In some instances, an algorithm can be defined that utilizes the distance curves as discussed in FIGS. 7A and 7B, to evaluate multiple possibly important features, and to find points (a subset of candidate cut-off points) to the right of a local maxima to propose a prediction horizon from the initial candidates. As the feature importance can evolve during the iterations, better candidates for prediction horizon are evaluated and overall improvement of the predictive model is achieved. In some instances, an algorithm as presented in FIG. 8 can be implemented to determine a prediction horizon by iterating over a first set of features and a set of candidate prediction horizons.

FIG. 8 represents example pseudo source code 800 for implementing an algorithm for prediction horizon determination in accordance with implementations of the present disclosure.

In the algorithm implemented at 800, variable S refers to a set of important features and is initialized as a set of all features (see Line 1). In the first 5 lines, a distance between RFDs is calculated for every feature f in a data set, and for each cut-off value in the range of possible predictive horizon (ph) values, where cut-off points are defined in a range defined between a lower to an upper time point.

At line 7, the main iterations of the evaluation of the CM data start. Within each iteration, distances for a given cut-off value are calculated (Line 9), and cut values to the right of local peaks are selected as prediction horizon candidates (Line 10). In some instances, a candidate cut-off point is determined to precede an identified local peak of a representation of distances from the calculated distances between the determined relative frequency distributions of the positive and the negative sub-sequences for each of the plurality of features. The candidate cut-off point can be determined as an end point of a buffer region around the identified local peak.

Based on determining a subset of the initial candidates of prediction horizon, relabeling is performed (Line 11). Then, a model is trained, using a classification algorithm that is capable of extracting a ranked list of important features. The list of features that are determined to contribute the most to the determination of a prediction horizon value can be extracted (Line 12). Model consistency is determined at in Line 13. Consistency can be defined to be the level of agreement between important features of the resultant model, and important features of the previous model which leads to a particular distance curve. Consistency can be one of the possible criteria for determining whether to stop further iterations or to converge (Line 16). At the end of the loop, the best model with highest quality is selected (Line 17), and the prediction horizon value of that iteration is proposed (Line 19).

Figure 9:
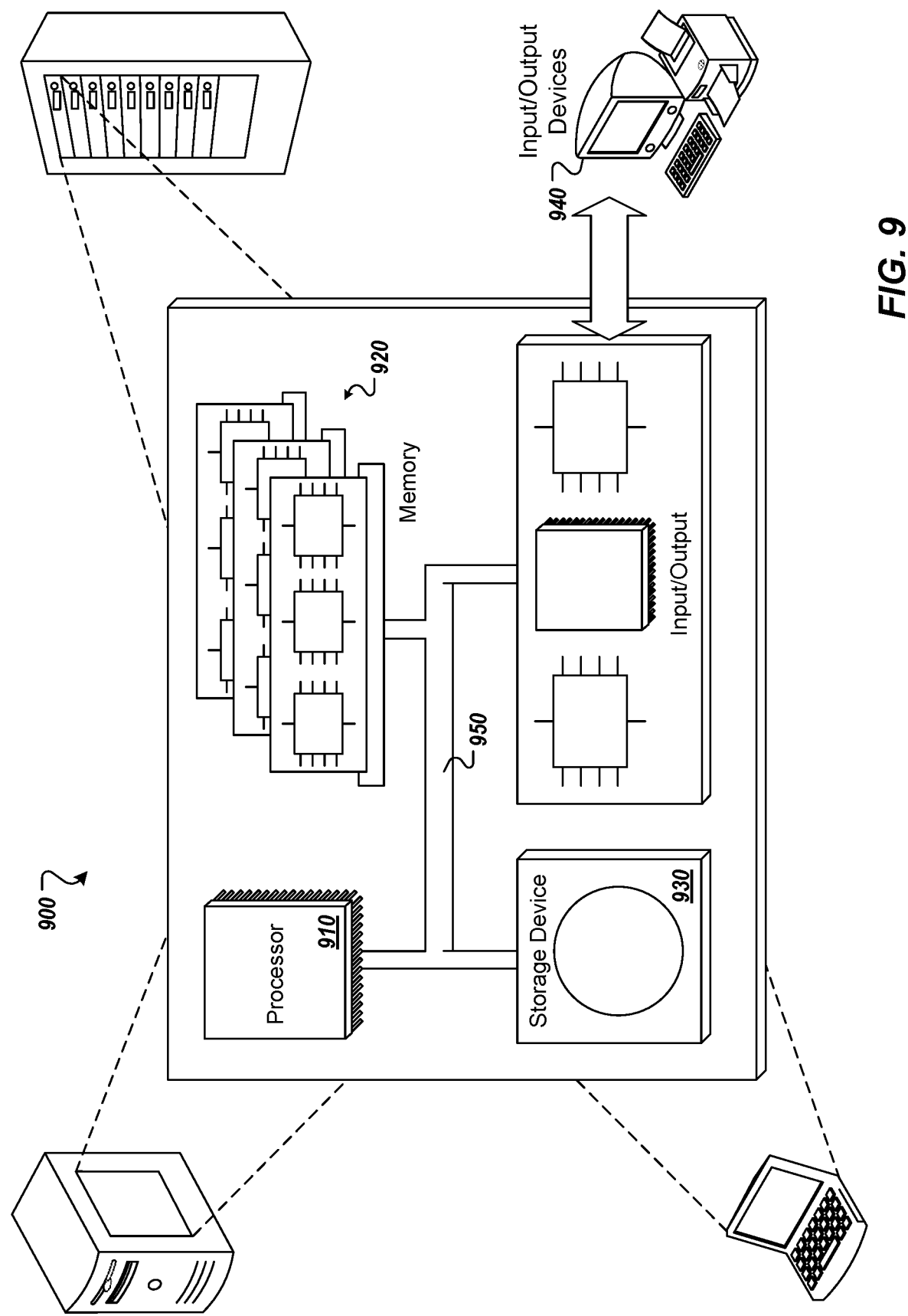
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. The components 910, 920, 930, and 940 are interconnected using a system bus 950. The processor 910 is capable of processing instructions for execution within the system 900. In some implementations, the processor 910 is a single-threaded processor. In some implementations, the processor 910 is a multi-threaded processor. The processor 910 is capable of processing instructions stored in the memory 920 or on the storage device 930 to display graphical information for a user interface on the input/output device 940.

The memory 920 stores information within the system 900. In some implementations, the memory 220 is a computer-readable medium. In some implementations, the memory 920 is a volatile memory unit. In some implementations, the memory 920 is a non-volatile memory unit. The storage device 930 is capable of providing mass storage for the system 900. In some implementations, the storage device 930 is a computer-readable medium. In some implementations, the storage device 930 may be a floppy disk device, a hard disk device, an optical disk device, or a tape device. The input/output device 940 provides input/output operations for the system 900. In some implementations, the input/output device 940 includes a keyboard and/or pointing device. In some implementations, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

Examples

In view of the above described implementations of subject matter this application discloses the following list of examples, wherein one feature of an example in isolation or more than one feature of said example taken in combination and, optionally, in combination with one or more features of one or more further examples are further examples also falling within the disclosure of this application.

Example 1. A computer-implemented method, the method being executed by one or more processors, wherein the method comprises:

receiving run-to-failure sequences of time series data for the machine asset, wherein each of the run-to-failure sequences includes an occurrence of a failure event and a corresponding portion of condition monitoring data associated with a time period preceding the occurrence of the failure event, wherein different portions of the condition monitoring data include different data for corresponding features from a plurality of features associated with the failure event;

iteratively evaluating the condition monitoring data associated with occurrences of the failure event, wherein iteratively evaluating includes:

dividing the run-to-failure sequences into sets of a negative and a positive sub-sequences (e.g., phases) of data associated with the features, wherein each run-to-failure sequence is divided in two based on a plurality of potential cut-off points defined for a corresponding iterative evaluation, wherein each set of a negative and a positive sub-sequences correspond to a run-to-failure sequence that is associated with the features, wherein the plurality of potential cut-off points are time points for evaluation of corresponding potential prediction horizons to determine a prediction horizon for the machine asset;

determining relative frequency distributions of the positive and the negative sub-sequences for each of the plurality of features and for each of the plurality of potential cut-off points;

calculating distances between the determined relative frequency distributions of the positive and the negative sub-sequences for the plurality of features for each of the plurality of potential cut-off points;

optionally iteratively plotting for a feature from the plurality of features, for each separate point from the plurality of potential cut-off points, a plurality of average representations of calculated distances on a two-dimensional curve, wherein each average representation is associated with a plurality of relevant features that are extracted in a previous iteration and with a corresponding cut-off point; and determining one or more candidate cut-off values from the plurality of potential cut-off points based on iterative evaluation of the plurality of potential cut-off points, wherein a candidate cut-off value is identified from the plurality of potential cut-off points as substantially corresponding to a local peak point of a plotted representation (e.g., 400 of FIG. 4) of distances between the determined relative frequency distributions of the positive and the negative sub-sequences;

iteratively labelling the condition monitoring data based on a candidate cut-off value from the one or more cut-off values to train one or more corresponding failure prediction models;

iteratively training a failure prediction model by using a classification algorithm to iteratively extract sets of features from the plurality of features, wherein the iteratively extracted sets of features includes features that are subsets of the set of all features and are determined at a corresponding iteration as relevant for predicting the failures for the machine asset;

selecting a candidate cut-off value from the one or more candidate cut-off values that is associated with the failure prediction model that is with a highest quality of the one or more failure prediction models corresponding to respective iterative steps of the training; and in response to the iterative evaluation based on the trained failure prediction model, determining a prediction horizon value corresponding to the determined cut-off value for the machine asset.

Example 2. The method of Example 1, further comprising:
receiving the condition monitoring data that is time series data including the plurality of features, wherein the features are time series data generated at a plurality of sensors.

Example 3. The method of Example 1 or 2, wherein first time series data from the condition monitoring data is associated with a first feature from the plurality of features, wherein the first feature is associated with one or more sensors from a plurality of sensors generating the condition monitoring data.

Example 4. The method of Example 3, wherein the first time series data is raw sensor data generated by one sensor from the plurality of sensors, or the first time series data is aggregate data as a function of sensor data read from one or more sensors from the plurality of sensors.

Example 5. The method of any one of the preceding Examples, further comprising:
receiving historic data related to at least one past failure event at the machine asset, wherein the historic data is received from a maintenance service collecting data for machine assets.

Example 6. The method of any one of the preceding Examples, wherein the run-to-failure sequences of time series data for the machine asset is determined based on combining the condition monitoring data and historic data related to at least one past failure event according to a time scale mapping.

Example 7. The method of any one of the preceding Examples, further comprising:
providing a notification for the determined prediction horizon as an alert for execution of a maintenance action for the machine asset whenever a positive prediction is made by the trained model based on the real time data.

Example 8. The method of any one of the preceding Examples, wherein the distances are calculated by using a Wasserstein distance measurement.

Example 9. The method of any one of the preceding Example, wherein iteratively evaluating the condition monitoring data associated with each of the features from the plurality of features further comprises:
iteratively compare sets of negative and positive subsequence of data associated with each of the plurality of features associated with the condition monitoring data.

Example 10. The method of any one of the preceding Examples, wherein iteratively evaluating the condition monitoring data associated with each of the features from the plurality of features further comprises:
calculating an average distance value for distances determined between relative frequency distributions associated with positive and negative sub-sequences associated with one or more features of the plurality of features, wherein the sets of positive and negative subsequences are defined for a given cut-off point.

Example 11. The method of any one of the preceding Examples, further comprising:
   plotting distances between relative frequency distributions of the positive and the negative sub-sequences defined for each of the plurality of potential cut-off points and associated with one or more features from the plurality of features.

Example 12. The method of any one of the preceding Examples, wherein a candidate cut-off point is determined to precede an identified local peak of a representation of distances from the calculated distances between the determined relative frequency distributions of the positive and the negative sub-sequences for each of the plurality of features, wherein optionally the candidate cut-off point is determined as an end point of a buffer region around the identified local peak.

Example 13. The method of any one of the preceding Examples, wherein the run-to-failure sequences of time series data include multi-variate time series sensor data obtained from multiple sensors, wherein the multi-variate time series include the plurality of features.

Example 14. The method of any one of the preceding Examines, wherein each of the positive sub-sequences is preceded by a corresponding warning time period.

Example 15. The method of Example 14, wherein the run-to-failure data includes a negative time period and a positive time period, wherein the negative time period is associated with a time period where the machine assets is in a healthy state, and wherein i) the positive time period ends with an occurrence of the failure event when the warning time is determined to be zero, or ii) the positive time period ends at the beginning of the warning time period, which precedes the occurrence of the failure event, wherein the positive time period comprises a potential prediction horizon for the failure event.

Example 16. The method of any one of the preceding Examples, further comprising:
   iteratively training a plurality of failure prediction models corresponding to the plurality of potential cut-off points using a binary classification algorithm; and
   determining the candidate cut-off value to define the prediction horizon value as a positive time period that is implicitly associated with an increased probability of occurrence of the failure event.

Example 17. The method of any one of the preceding Examples, wherein the negative and the positive subsequences are obtained by separating each run-to-failure sequence at the plurality of potential cut-off point, wherein each cut-off point is associated with a prediction horizon value.

Example 18. The method of any one of the preceding Examples, wherein the occurrence of the failure event comprises an unexpected maintenance-relevant event that occurred at the machine asset, for example, while in productive mode (e.g., in an industry manufacturing setup), or while in a simulation mode to generate test data.

Example 19. The method of any one of the preceding Examples, wherein the failure event is associated with a failure type (mode) of one or more failure modes relevant for the machine asset.

Example 20. The method of any of the preceding Examples, wherein a first feature from the plurality of features is associated with an operational characteristic of the machine asset, and a second feature from the plurality of features is associated with environmental conditions of an area surrounding a physical location of the machinery while in operation mode.

Example 21. The method of Example 1, wherein iteratively training the failure prediction model further comprises iteratively reducing the plurality of potential cut-off points to include candidate cut-off points that are associated with higher quality of the failure prediction model and to identify relevant features for predicting the failure event occurrence.

Example 22. A computer system comprising:
   a computing device; and
   a computer-readable storage device coupled to the computing device and having instructions stored thereon which, when executed by the computing device, cause the computing device to perform the method of any one of Examples 1 to 21.

Example 23. A computer-readable medium coupled to one or more processors and having instructions stored thereon which, when executed by the one or more processors, cause the one or more processors to perform the method of any one of Examples 1 to 21.

Example 24. A computer-implemented method for predicting failure event occurrence for a machine asset, the method being executed by one or more processors, wherein the method comprises:
   receiving run-to-failure sequences of time series data for the machine asset, wherein each of the run-to-failure sequences includes an occurrence of a failure event and a corresponding portion of condition monitoring data associated with a time period preceding the occurrence of the failure event, wherein different portions of the condition monitoring data include different data for a plurality of features associated with the failure event;
   determining one or more candidate cut-off values from a plurality of potential cut-off points based on iterative evaluation of the plurality of potential cut-off points, wherein a candidate cut-off value is identified from the plurality of potential cut-off points as substantially corresponding to a local peak point for calculated distances between relative frequency distributions of positive and negative sub-sequences, wherein the positive and negative sub-sequences are defined by dividing the run-to-failure sequences into two sets based on the plurality of potential cut-off points;
   iteratively training a failure prediction model by using a classification algorithm to iteratively extract sets of relevant features from the plurality of features to determine a prediction horizon for an occurrence of the failure event for the machine asset; and
   based on selecting a candidate cut-off value associated with a model of highest quality from a set of failure prediction models determined during the iterations, determining the prediction horizon for the machine asset.

Example 25. The method of Example 24, the method further comprises:
   iteratively evaluating the condition monitoring data associated with occurrences of the failure event, wherein iteratively evaluating includes:
      dividing the run-to-failure sequences into sets of a negative and a positive sub-sequences of data associated with the features, wherein each run-to-failure sequence is divided in two based on a plurality of potential cut-off points defined for a corresponding iterative evaluation, wherein the plurality of potential cut-off points are time points for evaluation of corresponding potential prediction horizons to determine a prediction horizon for the machine asset;
      determining relative frequency distributions of the positive and the negative sub-sequences for each of the plurality of features and for each of the plurality of potential cut-off points; and calculating distances between the determined relative frequency distributions of the positive and the negative sub-sequences for the plurality of features for each of the plurality of potential cut-off points.

Example 26. The method of Example 24 or 25, further comprising:

iteratively plotting a plurality of average representations of calculated distances on a two-dimensional curve, for each separate point from the plurality of potential cut-off points, wherein each average representation is associated with a plurality of relevant features that are extracted in a previous iteration and with a corresponding cut-off point.

Example 27. The method of Example 24 and/or 25, wherein each pair of a negative and a positive portion is a portion of the condition monitoring data from each of the run-to-failure sequences that is associated with a corresponding condition feature.

Example 28. A computer system comprising:

a computing device; and a computer-readable storage device coupled to the computing device and having instructions stored thereon which, when executed by the computing device, cause the computing device to perform the method of any one of Examples 24 to 26.

Example 29. A computer-readable medium coupled to one or more processors and having instructions stored thereon which, when executed by the one or more processors, cause the one or more processors to perform the method of any one of Examples 24 to 26.

What is claimed is:

1. A computer-implemented method for training a failure prediction model, the method comprising:

dividing run-to-failure sequences into sets of a negative and a positive sub-sequences of data associated with a machinery asset, each set associated with each feature of a plurality of features associated with a failure event, wherein each of the run-to-failure sequences include an occurrence of the failure event, and wherein each run-to-failure sequence is divided in two based on a plurality of potential cut-off points;

determining relative frequency distributions of the positive and the negative sub-sequences for each of the plurality of features and for each of the plurality of potential cut-off points;

calculating distances between the determined relative frequency distributions of the positive and the negative sub-sequences for the plurality of features for each of the plurality of potential cut-off points; and iteratively training a failure prediction model by using a classification algorithm to iteratively extract sets of features from the plurality of features, wherein the iteratively extracted sets of features include features that are subsets to one another and are determined at a corresponding iteration as relevant for predicting a potential prediction horizon for the machinery asset, wherein the failure prediction model is for use in determining a prediction horizon value for the machinery asset.

2. The method of claim 1, comprising:

for each separate point from the plurality of potential cut-off points and for a feature from the plurality of features, iteratively plotting a plurality of average representations of calculated distances on a two-dimensional curve, wherein each average representation is associated with a feature from the plurality of features and with a corresponding cut-off point.

3. The method of claim 1, further comprising:

selecting a candidate cut-off point from the plurality of potential cut-off points, wherein the selected candidate cut-off point is associated with a model version of a relatively highest quality from a set of failure prediction model version determined during the iterative training; and based on the selected candidate cut-off point, determining the prediction horizon for the machine asset.

4. The method of claim 3, wherein the candidate cut-off point is determined to precede an identified local peak of a representation of distances from the calculated distances between the determined relative frequency distributions of the positive and the negative sub-sequences for each of the plurality of features.

5. The method of claim 1, further comprising:

obtaining the run-to-failure sequences, wherein each of the run-to-failure sequences includes a corresponding portion of condition monitoring data associated with a time period preceding the occurrence of the failure event, and wherein different portions of the condition monitoring data include different data for the plurality of features associated with the failure event.

6. The method of claim 1, further comprising:

receiving condition monitoring data that is time series data including the plurality of features, wherein the features are time series data generated at a plurality of sensors.

7. The method of claim 6, wherein first time series data from the condition monitoring data is associated with a first feature from the plurality of features, wherein the first feature is associated with one or more sensors from the plurality of sensors generating the condition monitoring data.

8. The method of claim 7, wherein the first time series data is raw sensor data generated by one sensor from the plurality of sensors, or the first time series data is data aggregate das a function of sensor data read from the one or more sensors from the plurality of sensors.

9. The method of claim 7, wherein the run-to-failure sequences of time series data for the machinery asset is determined based on combining the condition monitoring data and historic data related to at least one past failure event according to a time scale mapping.

10. The method of claim 1, further comprising:

providing a notification for the determined prediction horizon as an alert for a manufacturing process using the machinery asset; or providing a notification for the determined prediction horizon as an alert for execution of a maintenance action for the machinery asset.

11. The method of claim 1, wherein the negative sub-sequences include respective negative time periods, wherein a negative time period is associated with a time period where the machinery assets is in a healthy state, wherein the positive sub-sequences include respective positive time periods, wherein a positive time period ends with an occurrence of the failure event, and wherein the positive time period comprises a potential prediction horizon for the failure event.

12. A system for training a failure prediction model, the system comprising:

a computing device; and a computer-readable storage device coupled to the computing device and having instructions stored thereon which, when executed by the computing device, cause the computing device to perform operations, the operations comprising:

dividing run-to-failure sequences into sets of a negative and a positive sub-sequences of data associated with a machinery asset, each set associated with each feature of a plurality of features associated with a failure event, wherein each of the run-to-failure sequences include an occurrence of the failure event, and wherein each run-to-failure sequence is divided in two based on a plurality of potential cut-off points;

determining relative frequency distributions of the positive and the negative sub-sequences for each of the plurality of features and for each of the plurality of potential cut-off points;

calculating distances between the determined relative frequency distributions of the positive and the negative sub-sequences for the plurality of features for each of the plurality of potential cut-off points; and iteratively training a failure prediction model by using a classification algorithm to iteratively extract sets of features from the plurality of features, wherein the iteratively extracted sets of features include features that are subsets to one another and are determined at a corresponding iteration as relevant for predicting a potential prediction horizon for the machinery asset, wherein the failure prediction model is for use in determining a prediction horizon value for the machinery asset.

13. The system of claim 12, wherein the instructions further comprise instructions which, when executed by the computing device, cause the computing device to perform operations, the operations further comprising:

for each separate point from the plurality of potential cut-off points and for a feature from the plurality of features, iteratively plotting a plurality of average representations of calculated distances on a two-dimensional curve, wherein each average representation is associated with a feature from the plurality of features and with a corresponding cut-off point.

14. The system of claim 12, wherein the instructions further comprise instructions which, when executed by the computing device, cause the computing device to perform operations, the operations further comprising:

selecting a candidate cut-off point from the plurality of potential cut-off points, wherein the selected candidate cut-off value is associated with a model version of a highest quality from a set of failure prediction model version determined during the iterative training; and based on the selected candidate cut-off point, determining the prediction horizon for the machine asset.

15. The system of claim 14, wherein the candidate cut-off point is determined to precede an identified local peak of a representation of distances from the calculated distances between the determined relative frequency distributions of the positive and the negative sub-sequences for each of the plurality of features.

16. The system of claim 12, wherein the instructions further comprise instructions which, when executed by the computing device, cause the computing device to perform operations, the operations further comprising:

obtaining the run-to-failure sequences, wherein each of the run-to-failure sequences includes a corresponding portion of condition monitoring data associated with a time period preceding the occurrence of the failure event, wherein different portions of the condition monitoring data include different data for the plurality of features associated with the failure event.

17. A non-transitory, computer-readable medium coupled to one or more processors and having instructions stored thereon which, when executed by the one or more processors, cause the one or more processors to perform operations, the operations comprising:

dividing run-to-failure sequences into sets of a negative and a positive sub-sequences of data associated with a machinery asset, each set associated with each feature of a plurality of features associated with a failure event, wherein each of the run-to-failure sequences include an occurrence of the failure event, and wherein each run-to-failure sequence is divided in two based on a plurality of potential cut-off points;

determining relative frequency distributions of the positive and the negative sub-sequences for each of the plurality of features and for each of the plurality of potential cut-off points;

calculating distances between the determined relative frequency distributions of the positive and the negative sub-sequences for the plurality of features for each of the plurality of potential cut-off points; and iteratively training a failure prediction model by using a classification algorithm to iteratively extract sets of features from the plurality of features, wherein the iteratively extracted sets of features include features that are subsets to one another and are determined at a corresponding iteration as relevant for predicting a potential prediction horizon for the machinery asset, wherein the failure prediction model is for use in determining a prediction horizon value for the machinery asset.

18. The computer-readable medium of claim 17, further storing instructions which when executed by the one or more processors, cause the one or more processors to perform further operations comprising:

for each separate point from the plurality of potential cut-off points and for a feature from the plurality of features, iteratively plotting a plurality of average representations of calculated distances on a two-dimensional curve, wherein each average representation is associated with a feature from the plurality of features and with a corresponding cut-off point.

19. The computer-readable medium of claim 17, further storing instructions which when executed by the one or more processors, cause the one or more processors to perform further operations comprising:

selecting a candidate cut-off point from the plurality of potential cut-off points, wherein the selected candidate cut-off value is associated with a model version of a highest quality from a set of failure prediction model version determined during the iterative training; and based on the selected candidate cut-off point, determining the prediction horizon for the machine asset.

20. The computer-readable medium of claim 19, wherein the candidate cut-off point is determined to precede an identified local peak of a representation of distances from the calculated distances between the determined relative frequency distributions of the positive and the negative sub-sequences for each of the plurality of features.

* * * * *